United States Patent [19]

Shouldis

[11] 4,454,630
[45] Jun. 19, 1984

[54] FISH CLEANING DEVICE

[76] Inventor: Charles E. Shouldis, MV Western Pacific, c/o Van Camp Samoa, Pago Pago, Tutulia, American Samoa, 96799

[21] Appl. No.: 409,460

[22] Filed: Aug. 19, 1982

[51] Int. Cl.³ .............................................. A22C 25/06
[52] U.S. Cl. ...................................... 17/70; 269/87.2; 269/239; 269/295
[58] Field of Search ........................... 17/44, 44.3, 70; 269/239, 87.2, 295; 294/104, 86 R

[56] References Cited

U.S. PATENT DOCUMENTS

| | | | |
|---|---|---|---|
| 2,586,732 | 2/1952 | Sohier | 17/70 |
| 3,833,967 | 9/1974 | Kieser | 17/70 |
| 4,205,832 | 6/1980 | Kuzio | 17/70 X |

Primary Examiner—Willie G. Abercrombie
Attorney, Agent, or Firm—Christopher H. Morgan

[57] ABSTRACT

A fish holding and cleaning device containing two frame members that are attached to one another by a hinge for folding to a closed carrying position and unfolding to an open, cleaning position. When opened to a cleaning position the ends of the frame members pinch together so that a fish tail can be captured therebetween. The head of a fish so captured can be secured to an outside end of one of the frame members by a hook and a biasing element such as a rubber band. Each frame member has a grooved cleaning surface upon which a fish resides when being cleaned on that side. By using the hook a fish can be moved to and secured to the opposite cleaning surface while its tail remains captured between the frame member ends. Pockets are attached below the frame members for the storage of cleaning tools.

11 Claims, 8 Drawing Figures

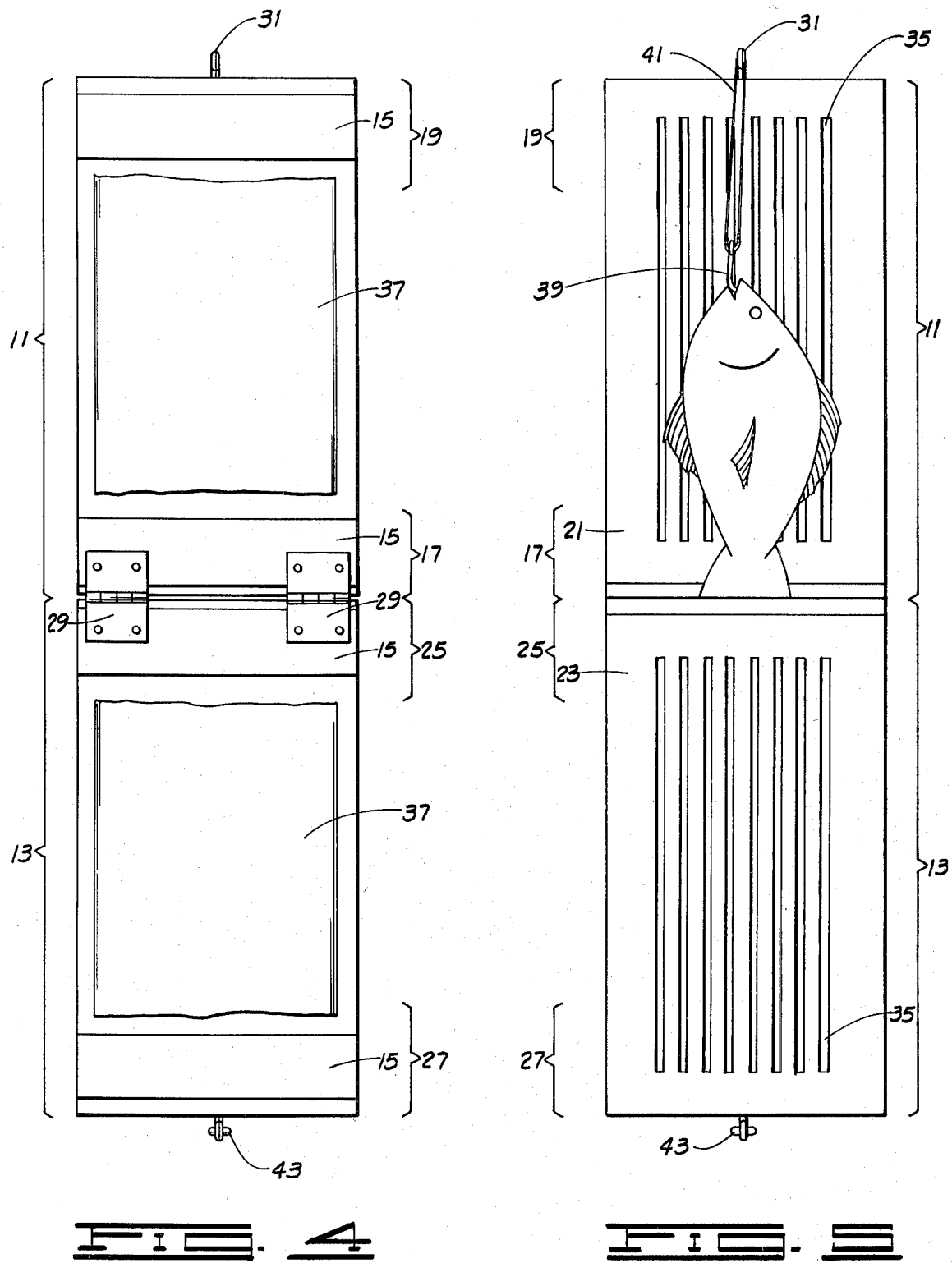

FISH CLEANING DEVICE

BACKGROUND OF THE INVENTION

1. Field of the Invention

This invention relates generally to devices utilized for or in connection with cleaning fish and more particularly, but not by way of limitation, to boards for holding a fish while it is being hand-cleaned.

2. Description of the Prior Art

The cleaning of a fish is a process which is well known to individuals who partake in the sport of fishing. One problem often encountered in hand cleaning of a fish is maintaining a hold on the fish. Scales and slime from the fish become ubiquitously distributed during the process of cleaning making it progressively more difficult and dangerous. The hands become less able to grip knives, scalers and the fish.

The prior art in the fish cleaning field includes a great number of boards for holding fish while cleaning. A problem with most of these devices is that, at most, they secure only one end of the fish requiring the person cleaning the fish to continuously manipulate and hold the other end (See, e.g., U.S. Pat. Nos. 3,503,094; 3,713,189; 4,127,919; and 2,607,070). Accordingly, these devices might reduce the slime problem but do not solve it. Even devices which can secure both ends of a fish require that the fish be handled a great deal during cleaning. For example, after a fish has been cleaned on one side it must be removed from its holder and turned over to clean the other side. Since the holders which can secure both head and tail of a fish are somewhat complex and hard to use, the amount of fish manipulation during cleaning may not be reduced at all despite the purpose of such holders. (See, e.g., U.S. Pat. Nos. 3,248,751 and 3,727,269).

Another problem of prior art fish cleaning boards is that they are large and cumbersome or have many pieces of equipment protruding from them. Usually this equipment is made of metal which quickly rusts and corrodes such that the holder is rendered nonfunctional. Noncorrosive metals are, of course, expensive. Usually, in addition to being large and cumbersome no provision is made for carrying the board or for storing cleaning items such as knives and the like.

SUMMARY OF THE INVENTION

It is accordingly an object of the present invention to provide a device that will secure a fish in an improved manner for cleaning. More particularly, the present invention is to provide a cleaning board which can secure both head and tail of a fish in an improved and simple manner.

It is also an object of the present invention to provide a means of cleaning a fish on both sides without having to remove it from the holding board or handle it.

Another object of the present invention is to provide such a cleaning board with a minimum of metal parts.

Yet another object of the invention is to provide a cleaning board that is compact, easy to transport and can hold all the necessary tools required for cleaning a fish.

In accordance with the objects the fish cleaning device of the present invention has a first and a second frame member made of wood each having a cleaning surface thereon. A hinge means connects these frame members in a folding relationship with respect to each other. When opened to a cleaning position the frame members are unfolded to rest on a flat surface such that the adjoining ends of the frame members pinch together above the hinge for capturing the tail of a fish therebetween.

In a preferred embodiment the device also includes a securing means for the head portion of a fish, the tail of which is captured between the frame members. This securing means includes a hook, which is placed in the mouth of fish, and a biasing means, such as a rubber band, connecting the hook to a selected one of the frame members such that the fish is stretched taut over a cleaning surface of the selected one of the frame members. After a fish, thus secured, is cleaned on one side, the rubber band is disconnected from the selected one of the frame members and used to turn the fish over to the cleaning surface of the nonselected frame member. The rubber band is then connected to stretch the fish taut for cleaning its other side.

In a preferred embodiment the device also includes a lateral friction means; preferably a plurality of longitudinal grooves across the face of the cleaning surface to keep the fish from moving from side to side during cleaning.

In a preferred embodiment the device also includes a pocket attached beneath a selected frame member to carry the tools necessary for cleaning a fish. When the frame members are in a folded position the pocket is disposed between the frame members and a latch is provided for latching the frame members in a folded position. This latch can be used as a handle for carrying the device and as a pair of hooks to which the rubber band can be secured.

For a further understanding of the invention and further objects, features and advantages thereof, reference may now be had to the following description taken in conjunction with the accompanying drawings.

BRIEF DESCRIPTION OF THE DRAWINGS

FIG. 4 is a bottom view of the device when in the cleaning position (open).

FIG. 5 is a top plan view of the device in cleaning position with a fish disposed for cleaning thereon.

DESCRIPTION OF PREFERRED EMBODIMENTS

Figure 1:
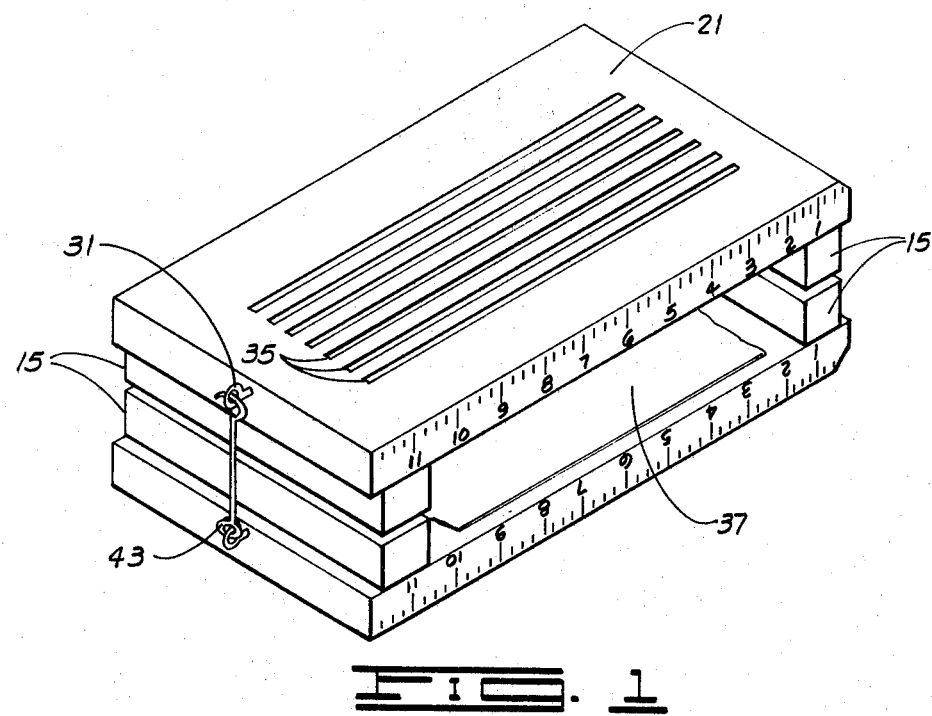
FIG. 1 is an isometric view of the device of the present invention in a folded position.
Figure 2:
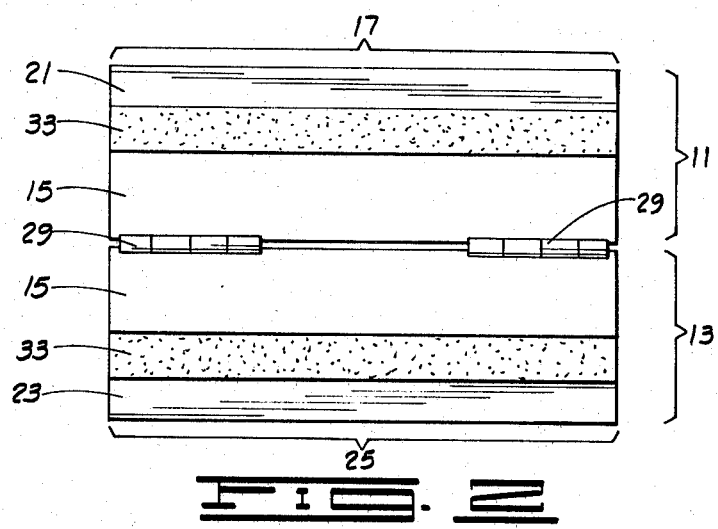
FIG. 2 is an end view of the hinged portion of the device in a folded position.
Figure 3:
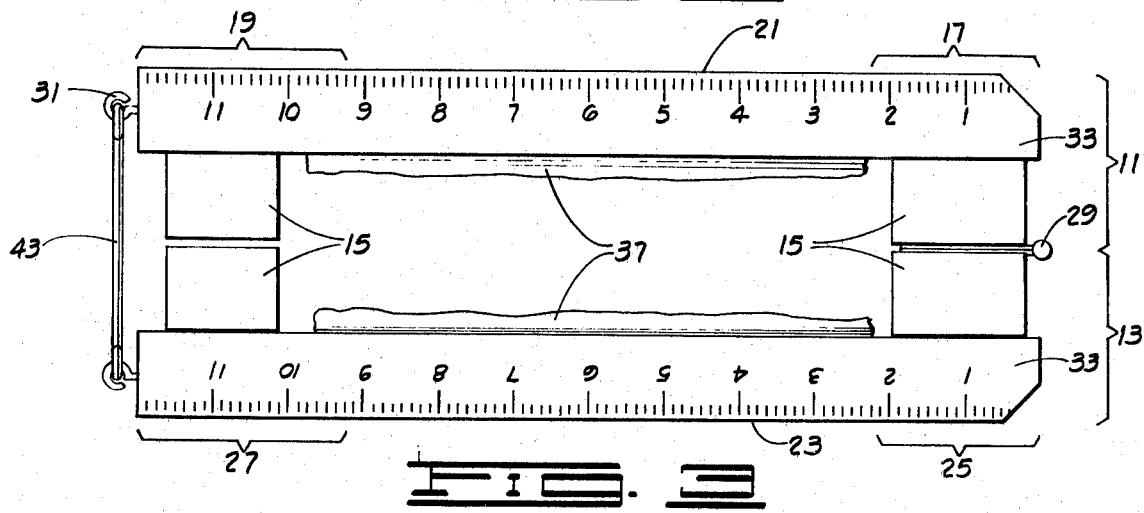
FIG. 3 is a side elevational view of the device in a folded position.

The fish cleaning device of the present invention includes first and second frame members 11 and 13, respectively, and can be seen in FIGS. 1, 2 and 3. The first and second frame members 11 and 13, respectively, are made of wood boards and include a first surface 21 for cutting and cleaning and a second surface 23 also for cutting and cleaning. Each frame member also has two wooden legs 15 attached one each to the first and second ends, 17 and 19, respectively, of the first frame member 11 and one each to the first and second ends, 25 and 27, of the second frame member 13. These legs can be attached by nails. They support the frame members when the cutting surfaces are uppermost and the frame members are resting on a level surface.

A hinge 29 is used to connect the first end 17 of the first frame member 11 to the first end 25 of the second frame member 13. Hinge 29 is connected in such a way that when in the folded or closed position the second end 19 of the first frame member 11 and the second end 27 of the second frame member 13 come together so that the legs 15 at these ends meet. The device can be secured in the folded position by placing a latch 43 into an eyelet 31. The latch 43 has a screw tip which is threaded into the wooden end 27 of member 13 and eyelet 31 is likewise threaded into end 19 of member 11.

When in an open or cleaning position (see FIGS. 4 and 5) the first end 17 of the first frame member 11 and the first end 25 of the second frame member 13 pinch together in such a fashion that a fish tail inserted between them is captured and held securely. On the surfaces of the ends which pinch together, 17 and 25, is a coat of abrasive paint 33. This abrasive paint 33 aids in maintaining a grip on the tail of the fish when it is held pinched between these ends 17 and 25.

Both members 11 and 13 have a plurality of longitudinal grooves 35 cut into their surfaces, 21 and 23, respectively, to restrain the fish from moving from side to side during cleaning. A fish pressed against the grooves 35 will somewhat deform to the grooves and be held therein.

Pockets 37 are provided on the underneath of each of the first and second frame members 11 and 13, respectively. These pockets 37 are disposed between the legs 15 and can be seen in FIGS. 3 and 4. The pockets 37 can carry the tools required by a person skilled in the art of cleaning fish, such as knives, pliers, scalers, etc.

In operation the invention can be easily transported, by using latch 43 as a handle, to the place of use. Once there is a fish to be cleaned, latch 43 is moved out of the eyelet 31 and the members 11 and 13 are opened. The tools needed are removed from the pockets 37. The device is then placed, cleaning surfaces up, on a flat surface so that the legs 15 support the member 11 and 13.

Figure 6:
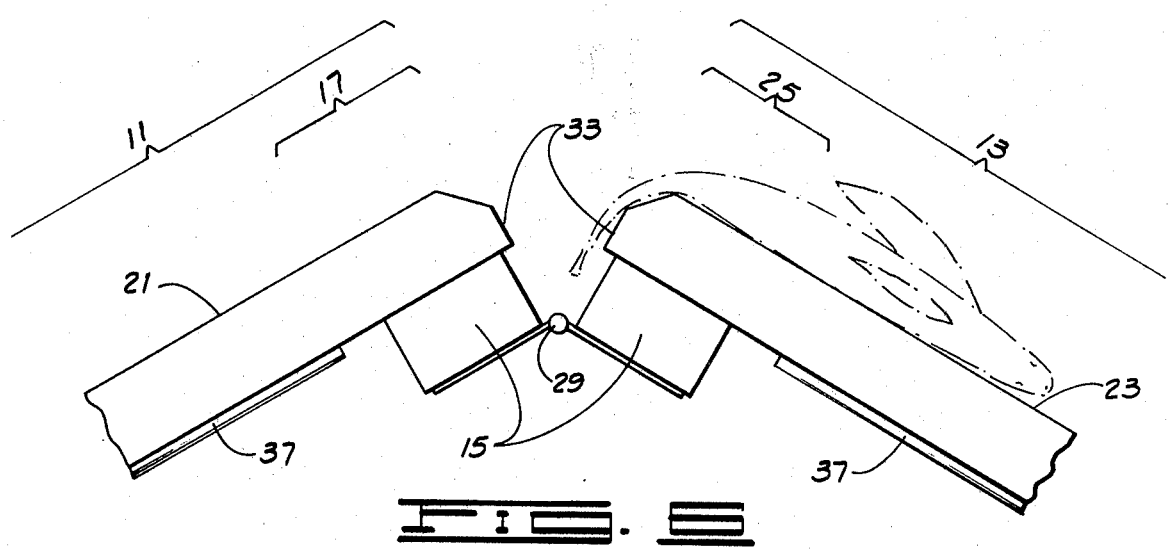
FIG. 6 is a side elevational view of the device showing the tail of a fish being placed between the frames.
Figure 7:
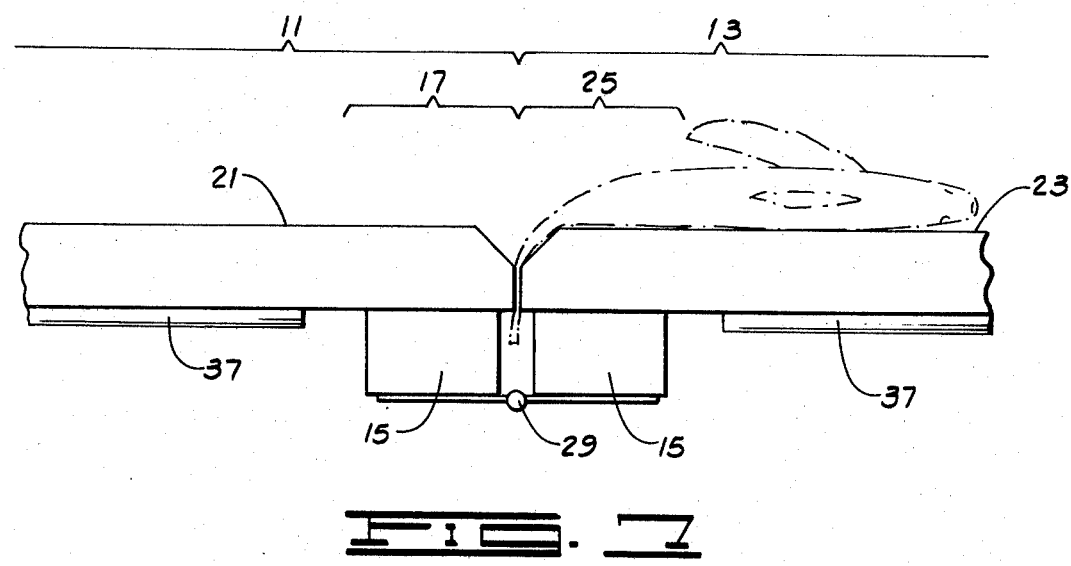
FIG. 7 is a side view of the device disposed in the cleaning position with a fish on a cutting surface.

To attach a fish for cleaning to the device the hinge 29 is lifted as shown in FIG. 6, so that there is an opening between the first end 17 of the first frame member 11 and the first end 25 of the second frme member 13. The tail of a fish is then placed between the first end 17 of the first frame member 11 and the second end 25 of the second frame member 13. The hinge 29 is then lowered to pinch and secure the fish tail. The abrasive paint 33 on the adjoining first end 17 of the first frame member 11 and the first end 25 of the second frame member 13 combined with the pressure exerted on the tail by the frame members and the weight thereon acts to secure the tail of the fish (see FIG. 7). A hook 39 is then placed in the mouth of the fish. The rubber band 41 that is attached to the opposite end of the hook 39 is then secured to eyelet 31 (or latch 43). The fish is now ready to be cleaned.

Because of the longitudinal grooves 35 cut in the first and second cleaning surfaces 21 and 23, respectively, the fish will not move from side to side during cleaning. Thus, the pinched tail and the hook 39 secure the fish against longitudinal movement while the grooves 35 secure the fish against lateral movement.

Figure 8:
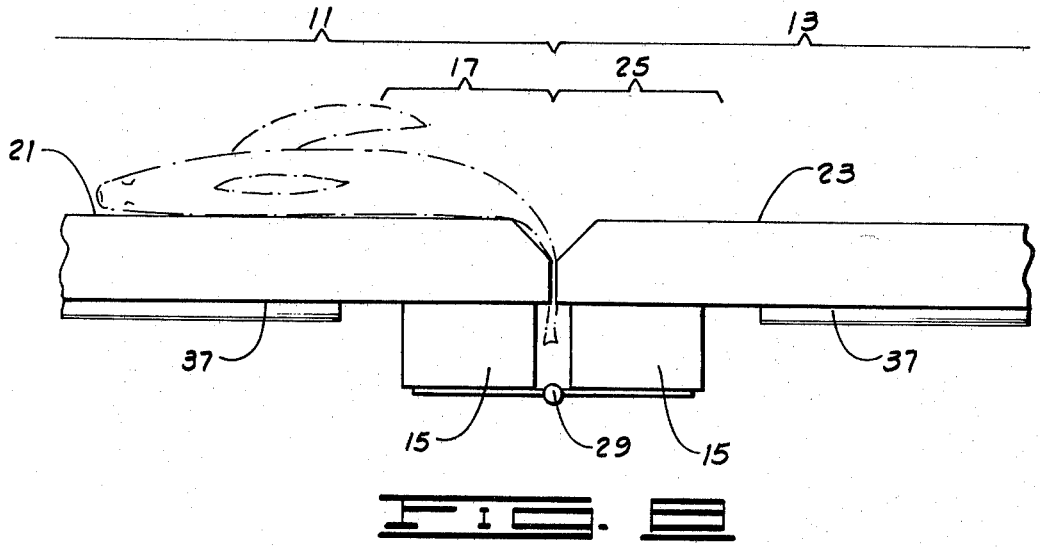
FIG. 8 is a side view of the device disposed in the cleaning position with a fish on a cutting surface.

When the first side of the fish has been cleaned the fish can be turned to clean the other side without having to touch it. This is achieved by removing the rubber band 41 from eyelet 31 (or latch 43) and reattaching it to latch 43 (or eyelet 31). Holding the hook 39, while still in the mouth of the fish, the head of the fish is lifted, in a circular motion, and laid to rest on the second cleaning surface 23 (or first cleaning surface 21). This is accomplished without removing the tail from between the first and second frame members, 11 and 13, respectively. The rubber band 41 is then secured to latch 43 (or eyelet 31) where the second side of the fish is then cleaned (see FIG. 8).

Once the fish has been cleaned on both sides the rubber band 41 is removed from latch 43 (or eyelet 31) and the hook 39 is removed from its mouth. The hinge 29 is again raised to release the tail.

If the cleaner so desires two fish may be attached to the invention at the same time using a second hook 39 and rubber band 41 and securing one on each of the first and second cleaning surface, 21 and 23, respectively.

Once the cleaning is completed the tools are replaced in the pockets 37 and the device is then restored to the folded position shown in FIG. 1. This is done by building the invention at hinge 29 such that the second end 19 of the first frame member 11 is in contact with the second end 27 of the second frame member 13. The invention is then secured by placing latch 43 into eyelet 31. Using the latch 43 as a handle the invention may be then moved to the next place of use or stored.

An important feature of this invention is the means by which the fish is secured to the invention so that the fish will not move during cleaning. The tail is secured between the first frame member 11 and second frame members 13; the head is secured with a hook 39 and rubber band 41 to either eyelet 31 or latch 43; and the longitudinal lines 35 prevent the fish from moving from side to side.

Another important feature of this invention is the lack of fish handling that must be done to clean the fish. Except for placing the fish on the invention before cleaning and removing it after cleaning, the fish need not be touched. This enables the users to keep their hands relatively free of fish scales and slime.

Yet another important feature of the invention is that there are very few moving or movable parts. This makes the invention easy to use and reduces the probability of the device breaking.

From the above description it can be seen that this invention provides a much simpler, but more efficient and convenient way of cleaning fish. Thus, the fish cleaning device of the present invention is well adapted to attain the objects and advantages mentioned as well as those inherent therein. While presently preferred embodiments of the invention have been described for the purpose of this disclosure, numerous changes in the construction and arrangement of parts can be made by those skilled in the art which changes are encompassed within the spirit of this invention as defined by the appended claims.

The foregoing disclosure and showings made in the drawings are merely illustrative of the principles of this invention and are not to be interpreted in a limiting sense.

What is claimed is:

1. A fish cleaning device comprising:

a first frame member having thereon a first cleaning surface and having a first end and a second end opposite said first end;

a second frame member having thereon a second cleaning surface and having a first end and a second end opposite said first end; and hinge means for connecting said first frame member to said second frame member in a folding relationship with respect to each other such that each of said first ends of said first and second frame members are urged to an adjoining position for capturing a fish therebetween and thereby holding a fish in a cleaning position on a selected one of said first or second cleaning surfaces when said first frame member and said second frame member are unfolded and disposed on a flat surface.

2. The fish cleaning device of claim 1 which further comprises:

fish securing means for securing and holding a head portion of a fish, a tail portion of which is captured between said first ends of said first and second frame members.

3. The fish cleaning device of claim 2 wherein said fish securing means comprises:

a hook for connecting to a head portion of a fish disposed in a cleaning position on a selected one of said first and second cleaning surfaces;

biasing means connected to said hook; and fastening means for connecting said biasing means to said second end of a selected one of said first and second frame members such that the fish is stretched taught over the cutting surface of a selected one of said first and second frame members.

4. The fish cleaning device of claim 1 which further comprises lateral friction means disposed on said first and second cleaning surfaces to resist lateral movement of a fish during cleaning to restrain the fish from moving from side to side during cleaning.

5. The fish cleaning device of claim 4 wherein said lateral friction means comprises a plurality of longitudinal grooves disposed in said first and second cleaning surfaces.

6. The fish cleaning device of claim 1 which further comprises:

a first pocket for holding fish cleaning articles fastened to said first frame member beneath said cleaning surface; and a second pocket for holding fish cleaning articles fastened to said second frame member beneath said fish cleaning surface.

7. The fish cleaning device of claim 1 which further comprises a frame locking means for securing said second end of said first frame member to said second end of said second frame member when disposed in a folded position.

8. The fish cleaning device of claim 7 wherein said frame locking means comprises:

a latch connected to said second end of said second frame member; and an eyelet connected to said second end of said first frame member for receiving and securing with respect thereto said latch.

9. The fish cleaning device of claim 8 which further comprises:

fish securing means for securing and holding a head position of a fish, the tail portion of which is captured between said first ends of said first and second frame members wherein said fish securing means includes:

a hook for connecting to a head portion of a fish disposed in a cleaning position on a selected one of said first and second cleaning surfaces;

biasing means connected to said hook; and fastening means for connecting said biasing means to said second end of a selected one of said first and second frame members such that the fish is stretched taught over the cutting surface of a selected one of said first and second frame members.

10. The fish cleaning device of claim 9 wherein said latch and said eyelet comprise said fastening means and wherein said biasing means comprises a rubber band.

11. The fish cleaning device of claim 1 which further comprises an abrasive paint on said first ends of said first or second frame members such that when placed in a cleaning position the adjoining ends of said first or second frames are covered with the abrasive paint.

* * * * *